(12) United States Patent
Haussner

(10) Patent No.: US 6,250,449 B1
(45) Date of Patent: Jun. 26, 2001

(54) CENTRIFUGAL MULTIPLATE CLUTCH

(75) Inventor: Torsten Haussner, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/414,792

(22) Filed: Oct. 8, 1999

(30) Foreign Application Priority Data

Oct. 9, 1998 (DE) .............................................. 198 46 561

(51) Int. Cl.$^7$ .................................................. F16D 43/18
(52) U.S. Cl. ................................ 192/105 CD; 192/107 T
(58) Field of Search ......................... 192/105 CD, 107 T, 192/75, 105 BA

(56) References Cited

U.S. PATENT DOCUMENTS

| | | | |
|---|---|---|---|
| 1,983,661 | * | 12/1934 | Frantz et al. .................. 192/105 CD |
| 3,718,214 | * | 2/1973 | Newman ........................ 192/105 CD |
| 3,945,478 | * | 3/1976 | Kellerman et al. ........... 192/105 CD |
| 4,016,964 | * | 4/1977 | Dietzsch et al. .............. 192/105 CD |
| 4,316,355 | * | 2/1982 | Hoff ....................................... 56/11.3 |
| 4,771,875 | * | 9/1988 | Suchdev et al. .............. 192/105 CD |
| 4,821,859 | | 4/1989 | Suchdev et al. .............. 192/105 CD |
| 5,096,261 | * | 3/1992 | Baloche ............................... 297/362 |
| 6,063,507 | * | 5/2000 | Blumel et al. ....................... 428/594 |

FOREIGN PATENT DOCUMENTS

| | | |
|---|---|---|
| 2 233 511 | 1/1974 | (DE) . |
| 75 06 785 | 3/1975 | (DE) . |
| 25 16 852 | 10/1975 | (DE) . |
| 32 38 815 | 5/1983 | (DE) . |

\* cited by examiner

Primary Examiner—Rodney H. Bonck
(74) Attorney, Agent, or Firm—McCormick, Paulding & Huber LLP

(57) ABSTRACT

In order to improve a centrifugal multiplate clutch with a pot-type clutch drum and a rotor which has several disk shaped plates, fixed on a motor shaft, each plate having a hub and a centrifugal weight connected by a rocker bar so that, when the no-load number of revolutions is considerably exceeded, the centrifugal weight is moved radially outwards and frictionally engages the clutch drum, the invention proposes that the plate contour is continuously tapered in its width starting from the hub to the transition of the rocker bar into the centrifugal weight.

11 Claims, 4 Drawing Sheets

CENTRIFUGAL MULTIPLATE CLUTCH

BACKGROUND OF THE INVENTION

1. Technical Field

The invention relates to a centrifugal multiplate clutch with a pot-type clutch drum and a rotor which shows several disk shaped plates, fixed on a motor shaft, for which respectively the hub and the centrifugal weight are connected over a rocker bar so that, when the no-load number of revolutions is considerably exceeded, the centrifugal weight is radially moved outwards and is frictionally put against the clutch drum.

The power transfer of a motor shaft of small hand-operated implements driven by an internal combustion engine mostly takes place over a centrifugal clutch to the driven shaft which is connected with the tool. The function of this centrifugal clutch is to separate the motor shaft from the driven shaft in the no-load r.p.m. range of the engine in order to guarantee an immobilization of the tool and to connect the motor shaft and the driven shaft in the load r.p.m. range of the engine with as little slippage as possible in order to allow a complete torque transfer to the tool. Especially in the transition area between these two modes of operation of the engine, undesired states appear for which, due to a slippage between the movable clutch parts and the clutch drum, it is not the full torque which is transferred to the driven shaft so that the full power of the engine is not available on the tool. Therefore, for centrifugal clutches the aim is to maintain this transition area as small as possible to be able to meet legal requirements which allow the rotation of the tool only in an upper no-load r.p.m. range as well as to avoid a slippage in the lower load r.p.m. range, to avoid mechanical as well as thermal damages of the clutch, especially of the clutch drum and the clutch bearings and to be able to transfer the desired torque to the tool.

2. Prior Art

According to the prior art, two types of centrifugal clutches are used at present. According to a first type, centrifugal segments which are maintained at no load at a distance from the clutch drum by means of retaining springs are used. By an increase of the number of revolutions, the centrifugal force of said segments exceeds the resilience of the springs so that the centrifugal segments are radially moved outwards and are frictionally put against the clutch drum. As an alternative, centrifugal multiplate clutches are used according to the prior art for which several separate disk shaped plates are put in a row on the motor shaft. For increasing the number of revolutions of the motor shaft, the centrifugal weights placed at the end of the plates are radially moved outwards until they frictionally engage with the clutch drum. Compared with the clutch working with centrifugal weight segments, the centrifugal multiplate clutch has, to begin with, the advantage of a more constant load of the clutch parts so that a deformation of the clutch drum is avoided because of several offset bearing spots of the individual plate parts. This can be achieved in particular by the offset mounting of the individual plate parts. Moreover, the clutch mounting is easier to manipulate, especially also for service cases. Finally centrifugal multiplate clutches are cheaper to manufacture because namely several congruent plates, which can be manufactured in a corresponding simplified way, can be used for the centrifugal multiplate clutch.

Multiplate clutches are used in particular for hand operated implements such as, for example, clutches for two-cycle lawn trimmers.

SUMMARY OF THE INVENTION

The aim of this invention is to improve the above mentioned centrifugal multiplate clutch. It must be reliably guaranteed on the one hand that a torque transfer from the motor shaft to the driven shaft takes place only after a number of revolutions is reached which is 25% over the no load number of revolutions. On the other hand, for reducing wear, the slipping free area must be configured as big as possible, i.e. a slipping through or a simultaneous slipping of the clutch parts between the operating states clutched in and disengaged must be avoided as far as possible.

This aim is achieved by the centrifugal multiplate clutch which is characterized according to the invention in that the plate contour is continuously tapered in its width starting from the hub to the transition of the rocker bar into the centrifugal weight. This construction guarantees that the plate is elastically deformable only in the area of the rocker bar so that the permanently elastic properties of the centrifugal clutch are kept over a long time. Through the enlarged rocker bar configuration close to the hub—compared with the embodiments known by the prior art—the result achieved is in particular that approximately the same bending stresses are reached over the whole rocker bar cross section.

So the width of the rocker bar is tapered at least in the area of its radial extension substantially square with increasing hub center distance. This almost parabolic configuration of the rocker bar which turns to an approximate arc of a circle into the centrifugal weight avoids local tension peaks. The rocker bar length is approximately double the biggest hub diameter, the taper proportion being approximately 50%.

The centrifugal weight outer shell shows at least substantially the same curvature as the clutch drum inner side in order that the outer surface of the radially excursed centrifugal weight adheres as fully as possible, i.e. on the whole surface to the inner diameter of the clutch drum. Moreover, when disengaged, the circle center defined by the centrifugal weight outer shell must be offset inwards with respect to the hub center. This taper which is defined by the gauge for recessing creates a safe distance between the centrifugal weights and the clutch drum inner shell.

Preferably a step with continuous transitions is formed in the transition area from the rocker bar to the centrifugal weight in the plate outer shell so that in the clutched state the rocker bar is at a distance from the clutch drum, i.e. only the centrifugal weight outer shell adheres to the clutch drum inner shell.

A further improvement is obtained when each plate possesses two centrifugal weights and the transition areas from the hub to the rocker bar form with their diagonals a sharp angle with the axis to which the centrifugal weights are placed symmetrical, the diagonal being inclined against the positive sense of rotation which is defined by the clockwise direction. An angle of 20 degrees +/−10 degrees is chosen as an optimal measure.

The centrifugal multiplate clutch is provided with several plates. For the arrangement of the different plates, the free ends of the centrifugal weights can be orientated against the direction of rotation which results in a certain self-reinforcing effect (servo-effect) of the centrifugal weights. For an arrangement of the plates for which the free ends of the centrifugal weights are orientated in the same direction as the direction of rotation of the clutch (towed arrangement), there results a pressing depending on the developing centrifugal force. Two plates are now preferably placed in the direction generating a self-reinforcing effect and one plate in the opposite direction (towed arrangement). Both plates placed in the "servo" direction cause a self-reinforcement which can result in the fact that the plates become bent out of their basic plane and are placed transversely. Through the third opposite plate, a support of the two other plates takes place so that the operating safety is increased.

In order to reduce the notch effect at particularly high stressed spots of the plates and in order to guarantee an all over bearing of the centrifugal weight as complete as possible on the clutch drum inner side, fine cut stampings are used as plates, the pull off surface being approximately $\leq 30\%$ of the material thickness.

According to an improvement of the invention, the plates consist of a material, preferably a steel, with an apparent limit of elasticity $R_p \geq 750$ N/mm², preferably $\geq 850$ N/mm² and/or a tensile strength $T_m \geq 850$ N/mm², preferably $\geq 900$ N/mm² and/or an elongation at rupture $A \geq 10\%$, preferably $\geq 15\%$.

According to another embodiment of the invention, the plates consist of rolled steel, whereby the structure orientation adjusted by rolling is inclined relative to the axis to which the plate halfs are symmetrical by an angle of approximately 75 degrees.

By rolling the steel band material there results in the material a structure orientation which is parallel to the direction of rolling. According to the invention, according to the specification above, the structure orientation is set approximately parallel to the outer edge of this material. By stamping the plates correspondingly offset at an diagonal angle of 15 degrees, the structure direction of the plate is approximately parallel to the narrowest part of the rocker part. Besides the advantageous geometrical configuration according to the invention, a high elasticity and a long lifetime are guaranteed herewith.

DESCRIPTION OF THE PREFERRED EMBODIMENT

Figure 1:
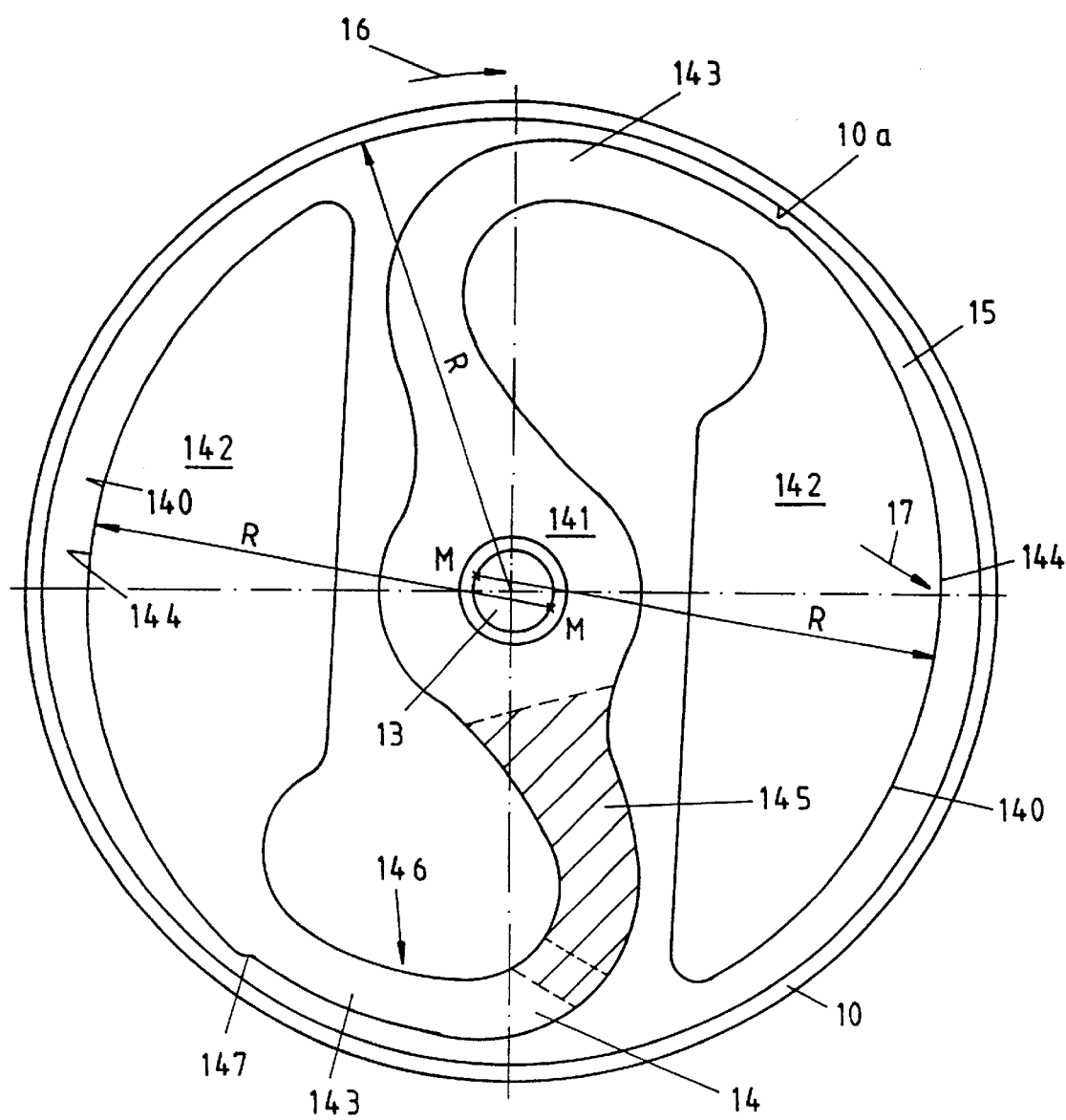
FIG. 1 is a top view of a centrifugal clutch according to the invention.
Figure 2:
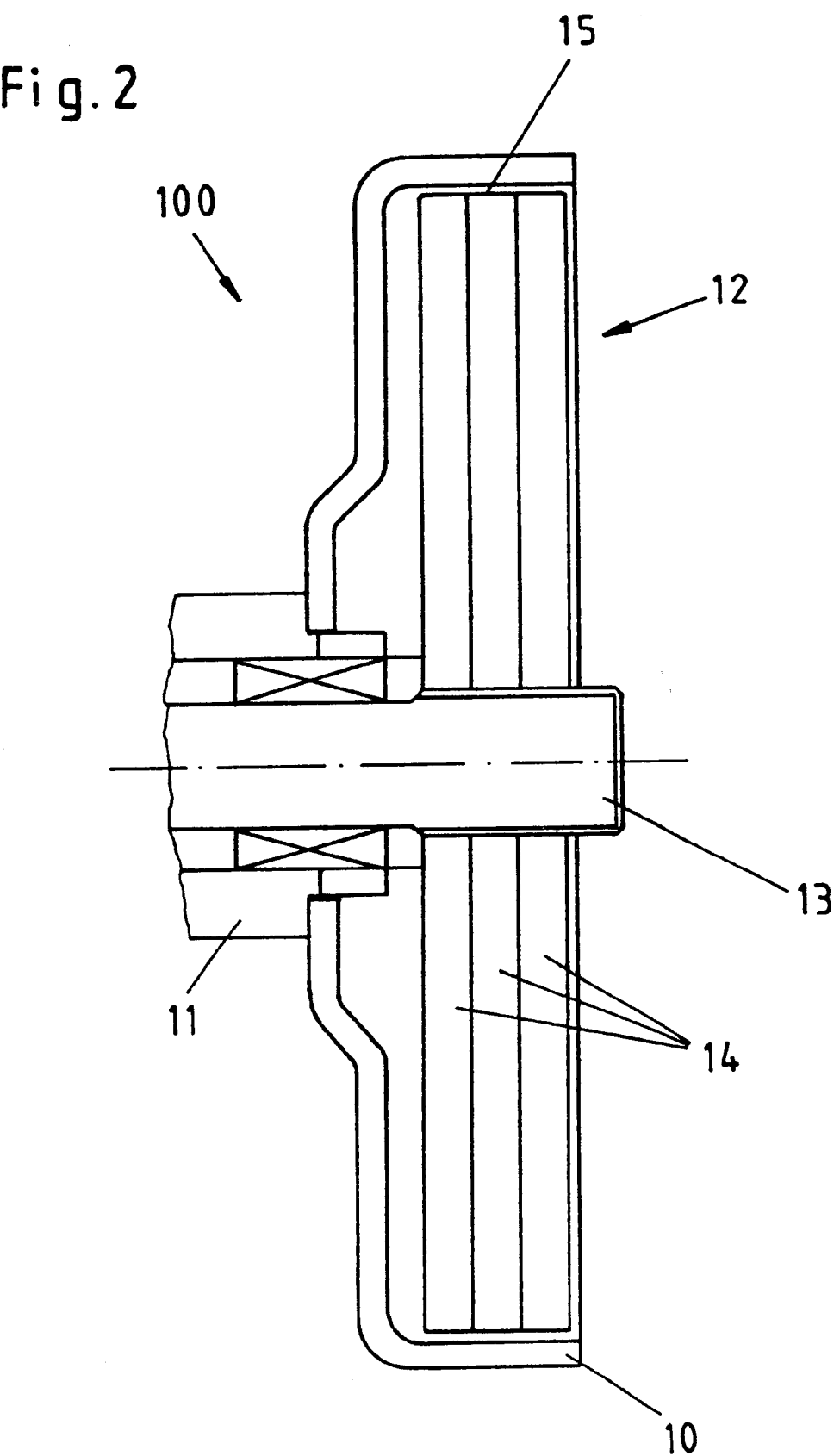
FIG. 2 is a sectional view of this centrifugal clutch.

The centrifugal multiplate clutch according to FIG. 1 and 2 has a pot-type clutch drum 10 with which the driven shaft 11 is connected to which the non represented tool is fixed and through the bottom opening of which a motor shaft 1 protrudes. A rotor 12 with several plates 14 placed on the motor shaft 13 is in the clutch drum inner space. An annular gap 15 is between the clutch drum inner shell 10a and the outer shell of the plates 14 when disengaged. Each of the clutch plates 14 possesses a hub 141 and two centrifugal weights 142 which are respectively connected with the hub 141 over a rocker bar 143. The plates 14 are simultaneously moved by rotation of the motor shaft 13. If the number of the revolutions exceeds the no-load number of revolutions by more than 25%, the centrifugal weights 142 are moved outwards by a slight swinging of the swivel arm 143 so that with their outer shell 144 they get frictionally engaged with the inner shell of the clutch drum 10 so that the motion of rotation is transferred to the driven shaft 11. In the present case, the rotor 12 has three clutch plates 13, two plates of which are placed in the direction of rotation 16 so that their centrifugal weights 142 are orientated against the direction of rotation—as can be seen in FIG. 1. The third plate is mounted in the reversed position, i.e. both centrifugal weights are placed respectively in the same direction as the direction of rotation (towed arrangement). Because of this measure, the "towed plate" placed as an outer plate can reduce the lateral swinging out of the inner pair of plates. The two other plates which are connected with the motor shaft 13 with respect to the direction of rotation 16 in the arrangement represented in FIG. 1 show however a "servo" effect which can be explained by the fact that the vector of the normal force 17 is turned slightly in the direction of rotation of the motor shaft which results in the fact that already a lower number of revolutions is sufficient to bring about a friction pairing without slippage of the centrifugal weights 142 with the drum inner shell. Due to this measure the r.p.m. range in which the clutch is inclined to slip through can be considerably reduced. For an arrangement of all plates in the mounting direction represented in FIG. 1, the described effect can still be increased correspondingly but with a plate placed oppositely, an optimal compromise is found for which a quick clutching is achieved by simultaneously reducing the lateral swinging out of the plates.

According to the invention, the plates 14 are configured as follows.

Figure 3:
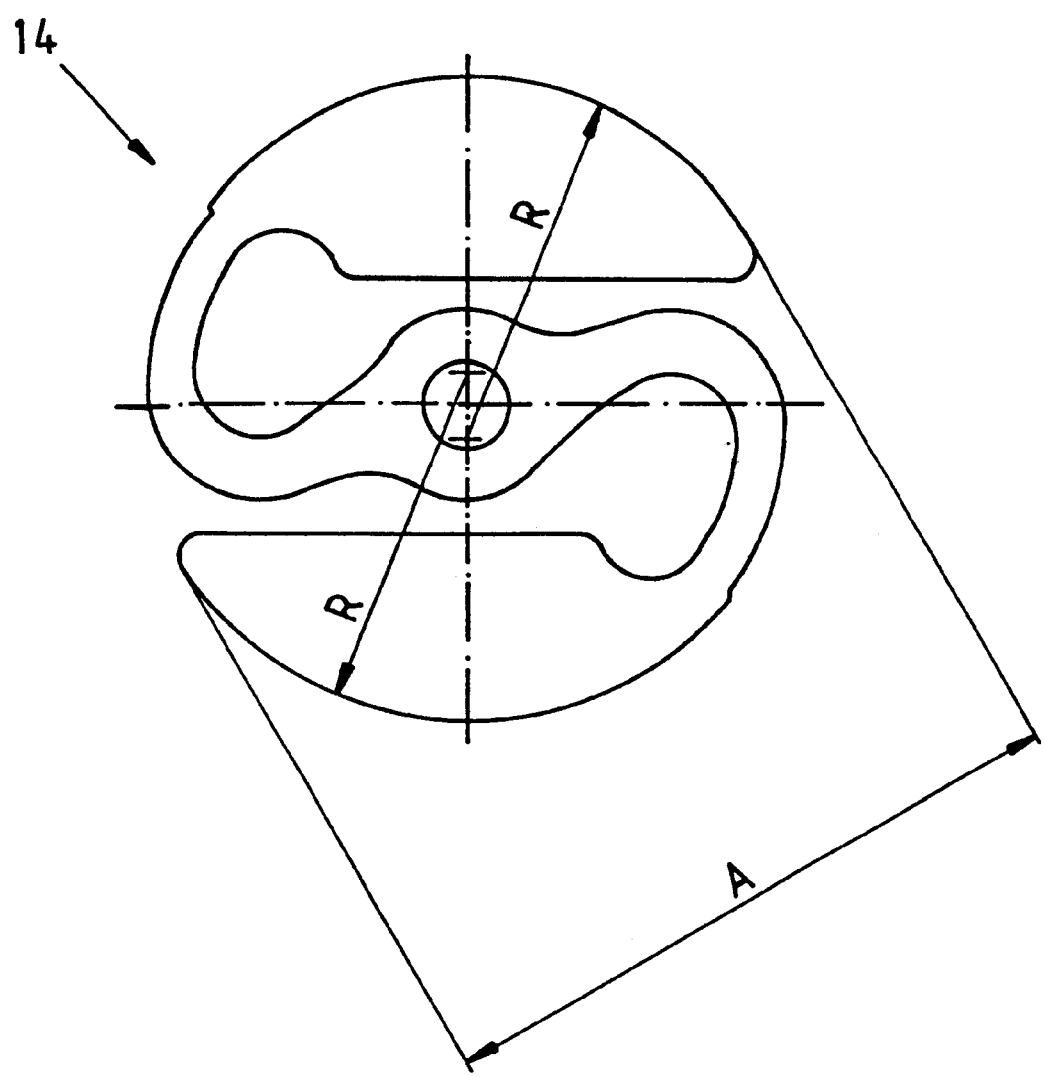
FIG. 3 is a top view of an individual representation of a plate.

First the hub 141 does not spring over to a constant width of the rocker bar but passes over a continuous taper up to the transition of the rocker bar 143 into the centrifugal weight. In the area 145 which is represented hatched in FIG. 1, the width of the rocker bar at the transition to the radially outside lying part tapers substantially square with the distance from the hub center. The plate 14 passes over in the following part 146 to a rocker bar part which is substantially partially circular parallel to the drum inner side. On the rocker bar outer shell the rocker bar passes over a step 147 with continuous transitions into the outer shell of the centrifugal weight 142, this outer shell 144 having a radius R which is equal to the radius of the drum inner shell. At the disengaged state according to the representation in FIG. 1, the respective centers M of the concerned partial arc of a circle which is constituted by the shells 144 are offset inwards with respect to the hub axis, this resulting in a gauge for recessing A (see FIG. 3) which is defined by the distance of the represented outer edges of the centrifugal weights and which is smaller than the inner diameter 2R of the clutch inner shell. So an undesired making contact of the plates with the clutch inner shell is surely avoided at a no-load number of revolutions. The length of the represented rocker bar 143 or 145, 146 is approximately double the hub diameter and tapers from the base to the transition into the centrifugal weight 142 by approximately 50%. The dimensioning of the substantially parabolic taper of the rocker bar is based on the calculation of a support fixed at one end, loaded at the end with a single force with a defined section modulus and a corresponding deflection. The base of the rocker bar, i.e. the connection of the part 145 to the hub 141 is widened as well as the part 146 has a configuration which is substantially partially circular with which tension peaks are avoided.

In a concrete embodiment, for a r.p.m. difference as low as possible between the catching r.p.m. and the slipping point r.p.m., a very tenacious material is selected with an extremely high tensile strength for a sufficient elongation in order to obtain a high resistance and dimensional stability for simultaneous good resilience properties. The selected material consists of a cold rolled steel strip with 90% spherical moulded cementite. A high elastic bent component with a permanent dimensional stability and a high abrasion resistance can be achieved with this steel. The rolled steel strip has an apparent limit of elasticity $R_p$ 0,2 of 850 N/mm², a tensile strength $R_m$ of 900 N/mm² and an elongation at rupture A5 of 15%.

In order to cause an optimal torque transfer by an improved frictional engagement of the surfaces 144 and the drum inner shell, a high surface quality of the outer edges of the swung out plate parts is necessary. For this purpose, the plates 14 are manufactured by fine blanking so that the pull off surface could be kept under 30% of the material thickness. For fine blanking, in practice, first only a few tenth millimeters are blanked before the proper edge of cut in order to reblank precisely the edge of cut then in a second step. Due to this measure, the part of the pull off surface is considerably minimized so that the notch effect can be reduced to a minimum.

Figure 4:
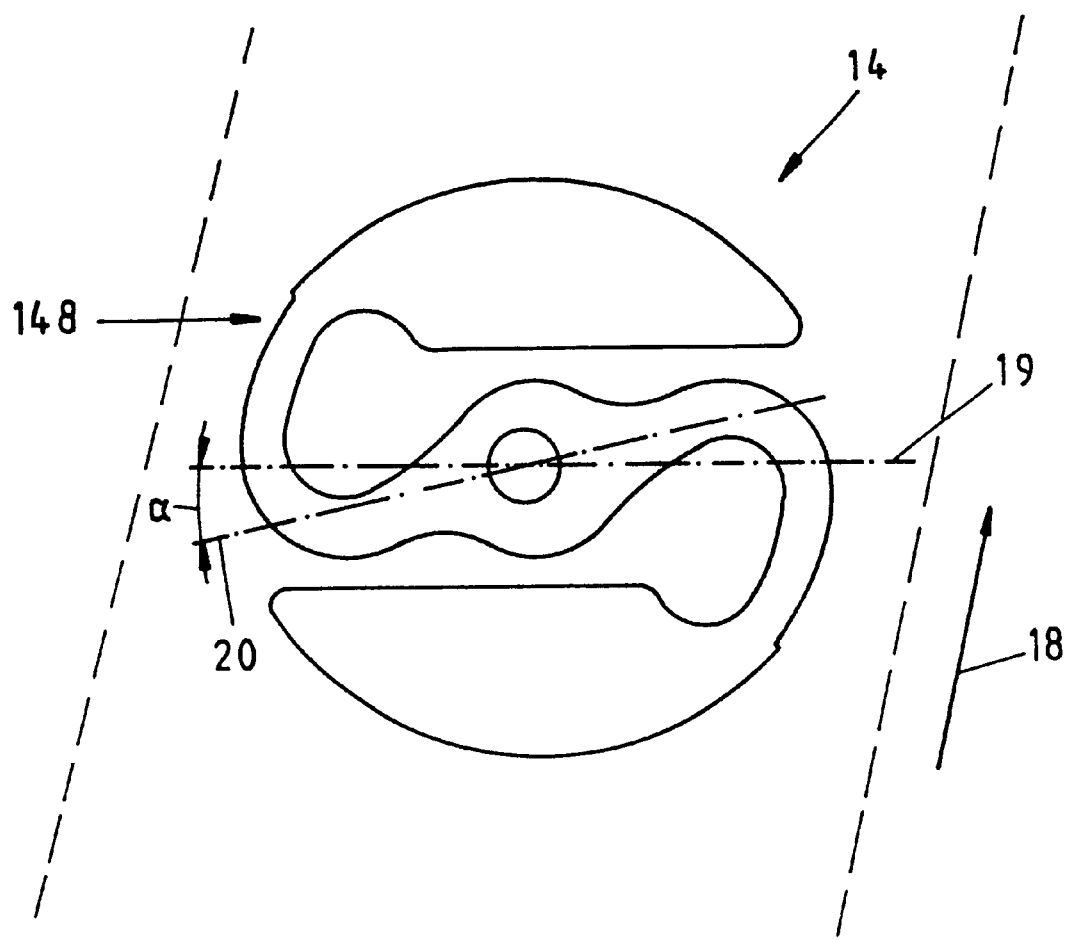
FIG. 4 shows the punching of the plate out of a rolled steel band.

FIG. 4 shows the orientation of the blanking direction with respect to the rolling direction which is indicated by the arrow 18. The rolling direction 18 is inclined with respect to the represented symmetry line 19, which is simultaneously the axis to which the plate parts are symmetric, by constituting an angle of 85 degrees.

Due to the rolling in direction of the arrow 18, there is in the material a structure orientation which is parallel to the direction of rolling. If the plates 14 are blanked out in the way seen in FIG. 4, the structure direction is approximately parallel to the narrowest part 148 of the rocker bar. Due to this measure, an optimal elasticity of the rocker bar relative to a radial swinging out is guaranteed as well as a long lifetime. There results a diagonal 20 of the respectively tapered rocker bar parts which is swiveled relative to the axis 19 by an angle α of approximately 20 degrees against the direction of rotation. The rocker bar is substantially S-shaped, whereby the centrifugal weights 142 have a big volume, the respective bearing surfaces 140 comprising a partial arc of circle of respectively 120 degrees. Due to the described geometrical as well as to the specific material selection, the clutch can be considerably optimized compared to the embodiments known by the state of the art.

LIST OF REFERENCE NUMERALS

Clutch drum 10
Clutch drum inner side 10a
Driven shaft 11
Rotor 12
Motor shaft 13
Plates 14
Annular gap 15
Direction of rotation 16
Normal force 17
Arrow/direction of rolling 18
Symmetry line/axis 19
Diagonal 20
Bearing surface 140
Hub 141
Centrifugal weights 142
Rocker bar 143
Shell 144
Area 145
Part 146
Step 147
Part 148
Radius R
Gauge for recessing A
Angle α(alpha)

What is claimed is:

1. A centrifugal multiplate clutch with a pot-type clutch drum and a rotor which has multiple disk shaped plates, fixed on a motor shaft, each plate having a hub and a centrifugal weight connected by a rocker bar so that, when the rotational speed of the rotor considerably exceeds a given value, the centrifugal weight is moved radially outwardly and frictionally engages the clutch drum,
wherein:
   each of the plates is cut from a sheet of material and has a constant thickness,
   each of the plates is unconnected with any other of the plates except for its being fixed on the motor shaft,
   the hub is of generally circular shape and the rocker bar has a length equal to approximately twice the diameter of the hub, and
   the rocker bar is continuously tapered in its width in going from a large width at the hub to a smaller width at the centrifugal weight.

2. A centrifugal multiplate clutch according to claim 1, wherein:
   the rocker bar has a radial portion extending generally radially outwardly from the hub and a circumferential portion extending generally circumferentially from the radial portion to the weight, the radial portion having a taper such that the width of the radial portion varies as a function of the square of its distance from the hub.

3. A centrifugal multiplate clutch according to claim 1, wherein:
   that the width of the rocker bar at the weight is approximately 50% of the width of the rocker bar at the hub.

4. A centrifugal multiplate clutch according to claim 1, wherein:
   the centrifugal weight has an outer surface and the clutch drum has in inner surface, said outer weight surface and said inner drum surface having a same radius of curvature, and in a disengaged state of the clutch, the center of the curvature of the outer surface of the centrifugal weight is offset relative to the hub center so that said hub center lies between the outer surface of the centrifugal weight and center of curvature of the outer surface of the centrifugal weight.

5. A centrifugal multiplate clutch according to claim 1, wherein:
   a step is formed in a transition area going from the rocker bar to the centrifugal weight so that, in the disengaged state, the rocker bar is at a distance from the clutch drum.

6. A centrifugal multiplate clutch according to claim 1, wherein:
   each plate possesses two centrifugal weights and two rocker bars, and the two radial portions of the two rocker bars extend along a diagonal line forming a sharp angle with an axis relative to which the centrifugal weights are symmetrical.

7. A centrifugal multiplate clutch according to claim 6, wherein:
   the sharp angle is 20 degrees+/−10 degrees.

8. A centrifugal multiplate clutch according to claim 1, wherein:

two plates are orientated with free ends of their centrifugal weights facing against a direction of rotation and one plate is orientated with a free end of a centrifugal weight facing in the direction of rotation.

9. A centrifugal multiplate clutch according to claim 1, wherein:

the plates are fine cut stampings each having a pull off surface which is $\leq 30\%$ of the material thickness.

10. A centrifugal multiplate clutch according to claim 1, wherein:

each plate consists of a material with a limit of elasticity $R_p \geq 750$ N/mm$^2$ and/or a tensile strength $R_m \geq 850$ N/mm$^2$ and/or an elongation at rupture of $A5 \geq 10\%$.

11. A centrifugal multiplate clutch according to claim 1, wherein:

each plate consists of rolled steel in which a structure orientation direction formed by rolling is inclined relative to an axis about which the plate is symmetrical by an angle of approximately 75 degrees.

* * * * *